United States Patent [19]

Ellison, Sr.

[11] 4,123,910
[45] Nov. 7, 1978

[54] AIR DRIVE ASSIST

[76] Inventor: Charles W. Ellison, Sr., 3933 Owens St., Whistler, Ala. 36612

[21] Appl. No.: 737,059

[22] Filed: Oct. 29, 1976

[51] Int. Cl.² .......................................... F02B 73/00
[52] U.S. Cl. ...................................... 60/698; 60/701;
60/412; 180/66 B
[58] Field of Search ............... 60/407, 409, 412, 698, 60/701, 716; 180/44 M, 44 F, 66 B

[56] References Cited

U.S. PATENT DOCUMENTS

| | | | |
|---|---|---|---|
| 1,013,528 | 1/1912 | Broderick | 180/66 B UX |
| 1,112,627 | 10/1914 | Kneedler | 60/412 |
| 1,347,805 | 7/1920 | Feagan | 60/412 |
| 2,544,606 | 3/1951 | Mallory | 60/412 X |

*Primary Examiner*—Edgar W. Geoghegan
*Attorney, Agent, or Firm*—Harold C. Hogencamp

[57] ABSTRACT

A combination automotive power system wherein a compressed-air motor supplements the primary gasoline-fueled internal combustion engine. Employs a common driveshaft and includes an air compressor powered by the primary gasoline engine, and a compressed-air storage tank intermediate of the compressor and the air motor.

3 Claims, 4 Drawing Figures

AIR DRIVE ASSIST

The present invention titled, AIR DRIVE ASSIST, relates to an improvement in automotive power systems. More particularly it entails means for supplementing the power derived from a normal type of gasoline-fueled automotive engine with drive power from a compressed air motor; thereby increasing fuel-efficiency while reducing air pollution.

As a fundamental fact, a gasoline powered engine is most efficient fuelwise when the highest percentage of its fuel-energy is being "burned" and converted to mechanical energy. Conversely, as is obvious, the least amount of air pollution from "unburned" fuel results when the highest percentage of fuel is being utilized to produce mechanical energy.

Inherently all gasoline-fueled engines are most efficient at some constant, or near constant, speed intermediate of their minimum and maximum speeds.

Government and other studies show that the greatest fuel-economy is obtained at about 35 to 40 M.P.H. highway speed. It has now been well-proven that a speed of 55 M.P.H. greatly reduces fuel consumption but a speed of 35 to 40 M.P.H. is even more efficient.

Obviously this is taken as an average and the numerous types, makes, and rated H.P. of engines means only that at some certain R.P.M. speed the engine itself is most efficient. Greatest now-possible efficiency is obtainable when the engine can be most continuously operated at its most efficient speed.

With out usual pattern of stop-and-go urban driving such a goal cannot be obtained with the usual gasoline engine powered car. Inherently the engine must run at greatly varying speeds in normal everyday use.

As dictated by the Laws of Physics, high torque is necessary to put an automobile into motion from a rest position and/or to accelerate its speed.

However, only low torque is required to maintain an auto at a given speed (on level ground) since a body in motion tends to remain in motion; friction being a counter-acting force.

Since rotary motion is required, regardless of the basic or modified type of automotive power plant, the velocity of this motion in R.P.M. also becomes a factor in considering the output power and fuel-efficiency of an engine.

Within limits a gasoline-fueled engine, as commonly employed to power automobiles, increases in H.P. as its' speed in R.P.M.'s increases. This, then, is exactly the reverse of out basic requirement: i.e. - High torque at low speed, to start the auto in motion, and low torque to maintain the auto at a steady speed. This accounts to some extent for the relative inefficiency of gasoline engines since, except on extended trips on limited access highways, the speed and power requirements of everyday driving are extremely variable.

Paraphrasing another Law of Physics: Energy cannot be manufactured, it can only be converted from one form to another. In conversion there are friction and heat losses. However, in the present invention such intermediate losses are more than compensated for by obtaining greater efficiency, and thereby less inherent energy losses, from the prime power source - the internal-combustion gasoline engine. This desirable result is obtained by mostly operating the engine within limits at a more efficient constant R.P.M. speed, even though not at its most efficient speed, rather than at the greatly-variable speeds normally required. The secondary compressed-air motor, deriving its energy from the gasoline engine via intermediate air compressors and compressed-air storage tank, assists and/or supplements the gasoline engine only as proves most feasible and at such times as to permit the prime engine to operate at such a more-efficient constant R.P.M. speed.

Prior-art patents show use of compressed-air-powered motors as the sole prime-movers to power automobiles. In such patents sources of power such as storage batteries and modified piston-engines are used to energize the required air compressors. The compressed-air-drive-motors are piston, rotary or turbine.

In the present invention, the usual gasoline or petrol-fueled engine is utilized as the prime-mover, also powering the air compressor or compressors. The compressed-air motor is employed to assist and/or supplement the power derived from the gasoline engine and might be of the piston, rotary, or turbine type. The gasoline-fueled internal combustion engine and the compressed-air assist motor are coupled to a common drive shaft.

In view of the foregoing, the prime object of the present invention, as indicated by its title, is to provide a method and means for assisting and/or supplementing the power produced by a gasoline-fueled automotive engine as needed in order to increase its fuel-efficiency.

A second object is to reduce air pollution.

Other objects will become apparent from the following description, the drawing, and the appended claims.

The drawings are simplified but show all elements necessary for an understanding of the invention. Details of construction of most prime components are omitted since such structures are in accordance with normal practice and are well known to those skilled in the art. Likewise, accessories such as those which are commonly thought of as essential to the operation of a gasoline engine are not shown (carburator, starter, generator, battery, gas tank, etc.), nor are details of the structure of the vehicle itself, except as essential for the mounting of the components thereon.

The ensuing description includes enough details of operation to insure a complete understanding of the invention since this is substantially a new, previously unknown, combination of well-known components. For instance: The gasoline powered engine might be one of any type currently used to power cars, and without modification thereof; the air compressors and the compressed-air-drive-motor can be of well-known types, as are the incidentals such as the electromagnetic clutches, the air-pressure-controlled switch, and the air control valves. Operation of such devices, as well as their structure, is well-known to those skilled in the art.

In the drawing:

Referring in detail to the drawings in which like reference numbers designate like parts:

FIG. 1 shows, in simplified form, the basic drive components of a gasoline-engine powered automobile as mounted on the frame 2 of a stripped-down chassis 1 and including front end wheel assembly 3 and rear wheel drive assembly 4 consisting of housing, wheels, axles, and differential 5. The rear wheel assembly 4 is driven by gasoline engine 6 via cruise control transmission 7, main drive shaft 8 and differential 5 in the usual manner. Supplemental required accessories and controls such as gas tank, battery, ignition system, radiator, generator, starter, throttle, etc., are of standard types and are not here shown, although necessarily needed to make the vehicle operational. Included in this Fig. are universal joints 9—9 and accelerator pedal 10 having the usual linkage 10A connecting it to the engine 6 throttle.

Figure 1:
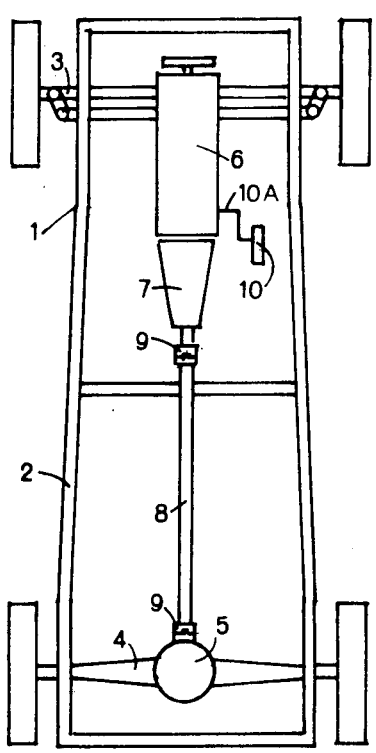
FIG. 1 is a diagrammatic plan view showing essential components of a typical gasoline-engine powered automobile.
Figure 2:
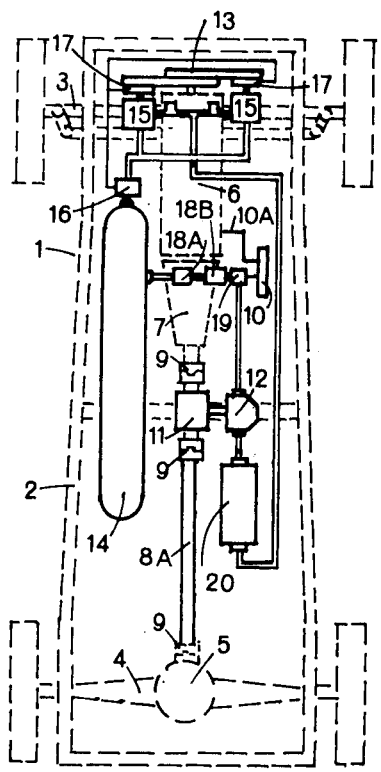
FIG. 2 is a diagrammatic plan view which includes air-motor components of this invention in combination with the components shown in FIG. 1.

FIG. 2 includes all of the basic components of FIG. 1, here shown in broken lines for the sake of clarity, with only one basic modification. It is to be noted that drive shaft 8 is here shortened and designated as 8A. Interposed between drive shaft 8A and transmission 7 is gear box 11, one of the added components of the new combination included in my invention and detailed in FIG. 3 of the drawings. Other components included in FIG. 2 are: compressed-air motor 12 coupled to gear box 11; air motor 12 being powered from compressed-air storage tank 14. Air compressors 15—15, driven by gasoline engine 6, as by belt and pulley drive 13, supply the air pressure to tank 14 which is interposed between these air compressors 15—15 and air-motor 12 and, obviously, there are tubular air lines connecting these components. Air-pressure controlled regulator switch 16 acts to electrically actuate electromagnetic clutches 17—17 which are similar to these employed with auto air-conditioner compressors and act to couple and uncouple air compressors 15—15 from their gasoline engine 6 drive as necessary to maintain the proper air pressure in tank 14. Also included in this FIG. are two identical solenoid type shut-off valves 18A and 18B energized by the car battery; lever operated air pressure control valve 19; and air muffler 20 which may, if desired, be inserted in a return-air line between the air-exhaust output from air motor 12 and the air input openings to compressors 15—15 as here shown.

It is to be noted that the three air valves 18A, 18B and 19 are arranged in tandem in the air supply line between tank 14 and air motor 12 and that valves 18A and 18B must both be in their open condition before compressed air from tank 14 can reach air-pressure control valve 19.

Valve 18A is actuated and opened by turning on an electric switch (not shown) in the car battery circuit. This switch is preferably and conveniently mounted on the dashboard or steering wheel column.

Valve 18B is also actuated and opened by means of an electric switch in the battery circuit. This second switch is automatically turned on when the automatic transmission selector lever is moved to the normal forward drive position. The switch (not shown) operates similarly to the commonly used "back-up lights" switch but only acts to open valve 18B when the car is shifted to forward drive. i.e. - The air pressure from tank 14 is cut-off by valve 18B when the shift lever is in park, neutral and/or reverse.

Lever operated valve 19 controls the air pressure, and thereby the speed and power of air motor 12. This valve 19 is incorporated by linkage 30-31 with the throttle - accelerator pedal 10 of gasoline engine 6 in a manner shown in FIG. 4 of the drawings and hereinafter described.

Figure 3:
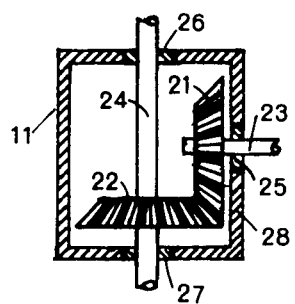
FIG. 3 shows the structure of a typical gear box as might be employed in the invention.

FIG. 3 shows more detailed construction of gear box 11, meshing bevel gears 21 and 22 are affixed, respectively to shafts 23 and 24 which extend through bearings 25, 26 and 27 inserted in the walls of gear box housing 28. Gears 21 and 22 might conveniently be identical or, should other than a 1 to 1 ratio be desired, could differ to meet such ratio but of course still properly meshing.

Figure 4:
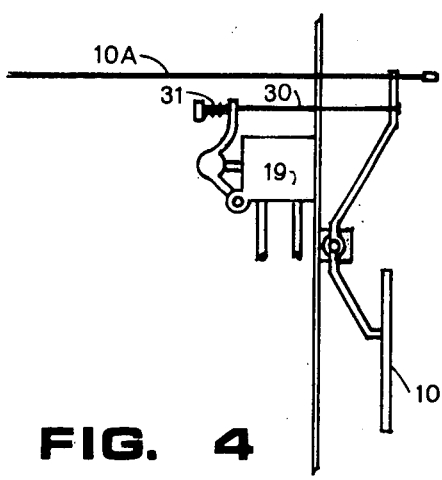
FIG. 4 shows the arrangement of the common accelerator means.

In FIG. 4, showing the arrangement of the common accelerator means, accelerator pedal 10 with engine throttle linkage 10A remain as in FIG. 1. However, a second linkage means 30 is provided to physically activate lever-operated air control valve 19. Linkage means 30 includes spring 31 which acts, by compressing, to allow further downward movement of accelerator pedal 10 after linkage 30 has fully opened lever-operated air valve 19.

Thus, during the first sector of downward movement of pedal 10 air valve 19 would be gradually opened to control air pressure to air motor 12. During this first sector of pedal 10 movement linkage 10A would simultaneously act to open the throttle of gasoline engine 6. However, the throttle-linkage 10A is so adjusted that during this sector of movement engine 6 will only be accelerated to substantially the amount or speed required to operate air-compressors 15—15 to maintain sufficient air pressure in storage tank 14 to operate air motor 12 at maximum power.

During the second sector of movement of pedal 10 - after air-control valve 19 has been fully opened - spring 31 will compress and the throttle of gasoline engine 6 will be opened and the speed of engine 6 will be accelerated as in its normal manner. Thus, the gasoline engine power will "take over" and the car will be speeded up beyond the capability of the air motor alone.

In operation, my AIR DRIVE ASSIST is employed in a controlled-automatic manner in such a way as to minimize changes in normal driving habits.

Primarily the compressed-air motor 12 is used to assist and/or supplement the gasoline-engine 6 drive of the auto in two ways: (A) to provide extra power and assist the gasoline-engine 6 in starting movement of the car from a stand-still or stopped position - when the gasoline-engine 6 itself provides the least torque and has its least horsepower and (B) to alone, or with little direct driving power aid from the gasoline-engine 6, power the car at reasonably constant cruising speeds on a highway.

Even when first starting the car, as in the morning, the air-motor 12 has assist-power available by reason of the air pressure storage available from the compressed-air tank 14. Obviously, while engine 6 is running, even in start-and-go driving, the air pressure in the compressed-air tank 14 is being replenished by the gasoline-engine-driven air compressors 15—15.

On the open highway and at reasonable cruising speeds on level roads where less torque and driving power is needed to keep the car in constant motion, the air-motor 12 by itself will often suffice. The gasoline-engine 6 needing then only to power the air-compressors 15—15. With cruise control, the gasoline engine 6 automatically accelerates to provided additional power when needed and also, if greater speed is needed or wanted this can readily be obtained by simply "stepping down" on the accelerator pedal 10.

In the construction depicted in FIG. 1 - power in the usual manner by only the gasoline engine 6 - the car would operate in the normal manner and this needs no explanation.

From FIG. 2 of the drawings and the foregoing description thereof, it will be seen that the only mechanical modifications of the basic automobile structure 1 of FIG. 1 is the shortening of the main drive shaft 8 (8A) and the interjection of gear box 11 between the drive shaft 8A and transmission 7. Therefore, without any use of the supplemental air-drive components of the invention, the automobile could still be powered by the internal combustion engine 6 alone in the conventional way.

As supplemented by the addition of the compressed-air motor 12 and its added adjuncts as shown in FIG. 2, the starting operation would be as follows: Initially, after starting the gasoline-engine 6 in the usual manner, and before attempting to put the car in motion, the master electric controlled air shut-off valve 18A would be opened by turning on the dashboard electric switch (not shown). The car is then put into forward drive gear and the accelerator pedal 10 is pressed down in the usual manner. In so doing, air pressure is first applied to the compressed-air motor 12 and further pressure on the accelerator pedal 10, if necessary, will also act to speed up the gasoline-engine 6 as shown in the description of FIG. 4 and the car would move forward. If it was necessary to first back up, the air pressure line to the air accelerator valve 19 would remain de-activated since valve 18B would remain shut off and the gasoline-engine 6 alone would power the car.

On subsequent starts of the car from a stand-still position, as in traffic or after parking, the same operation and/or operations would occur. For forward movement, as is most usual, the power of the air-motor 12 would assist the gasoline-engine 6 in starting the motion of the car, thus reducing strain, power loss and pollution from the gasoline-engine 6 at its most inefficient phase of operation. Often under favorable circumstances the air-motor 12 by itself might suffice to start the car into motion.

It is to be especially noted that no attempt has been made in FIG. 2 of the drawings to show the actual physical sizes of the compressed-air motor 12, the air compressors 15—15, or the compressed air storage tank 14. It is realized that to be effective the air motor 12 must be of at least 4 to 10 H.P. or more, depending upon the size, weight, etc. of the automobile. Likewise, the air compressors 15—15 must provide the necessary volume and pressure of air to drive the air motor 12 and the storage tank 14 must be of sufficient volume to meet the needs. Positioning and mounting of the air motor 12 with direct coupling to the driveshaft gear box 11 are shown in most simplified relationship for purpose of explanation. However, the air motor and compressors are of relatively small size as is made apparent from the sizes of air-conditioner compressors of sizeable horse power capabilities.

The scope of this invention is not to be restricted by reason of these factors - physical sizes, mounting positions, and/or required coupling of the air motor 12 to the main driveshaft 8A of the vehicle.

My invention is to be limited only by the appended claims.

Having thus disclosed my invention, what I claim as new and desire to protect by Letters Patent is:

1. An automotive power system comprising in combination; a gasoline fueled internal combustion engine; a cruise-control transmission coupled to said engine; a main drive shaft; a gear box interposed between and coupled to said cruise-control transmission and said drive shaft; a compressed-air motor coupled to said gear box; an air compressor driven by said gasoline engine by belt and pulley drive; and a compressed-air storage tank interposed between said air compressor and said compressed-air motor and connected to these components by tubular air lines.

2. The combination as set forth in claim 1 including an electromagnetic clutch to couple and uncouple said air compressor from its belt and pulley drive; and an air-pressure controlled regulator switch to electrically actuate said electromagnetic clutch.

3. The combination of claim 1 including automatic means whereby said compressed-air motor can be activated only when said transmission is in forward drive position.

* * * * *